June 14, 1960  J. F. JACOBY  2,941,176
HEATER WIRE
Filed Jan. 27, 1959

Inventor:
Joseph F. Jacoby
by Allard A. Braddock
His Attorney

United States Patent Office 2,941,176
Patented June 14, 1960

2,941,176
HEATER WIRE

Joseph F. Jacoby, Asheboro, N.C., assignor to General Electric Company, a corporation of New York Filed Jan. 27, 1959, Ser. No. 789,387

10 Claims. (Cl. 338—262)

This invention relates to wire used in electrically heated fabrics such as electric blankets and sheets.

Electric blankets and sheets consist of two-ply textiles with insulated copper wires of small cross-sectional area—known as heater wires—flexibly secured between the plies. The wires are energizable under the control of a thermostat to provide a selection of heat levels. Heater wire may have several layers of insulating material. Typically, the outer layer of insulating material is polyvinyl chloride, nylon, rubber, various copolymers such as butadiene-acrylonitrile, acrylonitrile and an acrylate, and others.

Conventionally, the outer protective insulating layer of heater wire is applied by extrusion—a process which requires very careful control of the viscosity of the feed stock. The viscosity is controlled by adding plasticizers to the extrusion mixture and regulating the temperature of the feed stock so as to provide the viscosity which will produce easy feed and extrusion in addition to imparting the necessary form stability after the feed stock has been extruded on the wire.

The plasticizers used in extrusion mixtures are those which have the least adverse effect upon the properties of the product after extrusion is complete. Plasticizers generally represent a reduction in desirable properties of the final product. In the case of blanket wire, an objection attendant upon the use of plasticizers has been that blankets could not be subjected to dry cleaning without the risk that the plasticizer would be leached out by the dry cleaning solvents, which include perchloroethylene, trichloroethylene, carbon tetrachloride, and petroleum solvents such as Stoddard's solvent. Obviously, it is frequently desirable to subject electric blankets to dry cleaning rather than ordinary laundering.

One of the objects of the present invention is to provide a wire which can be subjected to dry cleaning without degrading its insulation.

Another object of the invention is to provide a blanket wire insulation containing a plasticizer which can withstand repeated dry cleaning.

Figure 1:
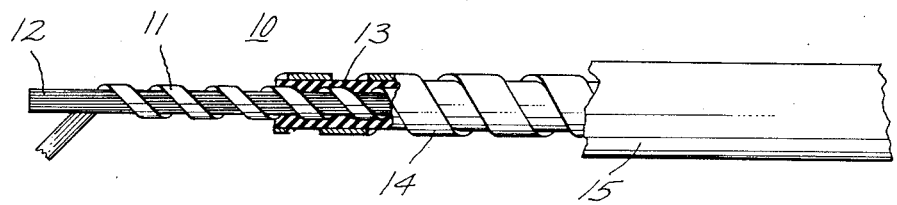
Figure 2:
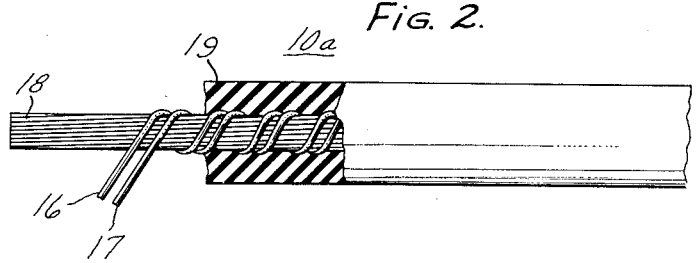
Figure 3:
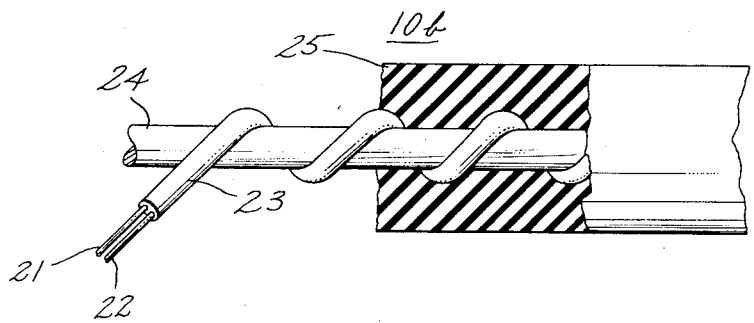

Other objects of the invention will become apparent from the following specification considered in conjunction with the attached drawing in which Fig. 1 is an enlarged elevation, partly in section, showing one form of heater wire embodying this invention; Fig. 2 is similar to Fig. 1 showing an alternative form of heater wire; and Fig. 3 is similar to Figs. 1 and 2 showing an additional embodiment of heater wire.

Briefly stated, in accordance with one of its aspects, the invention is directed toward solvent-resistant wire comprising a conductor with an outer protective layer of extruded insulating composition containing from 20% to 40% by weight of a plasticizer selected from the group consisting of pentaerythritol esters and dipentaerythritol esters, and mixtures thereof.

In the present invention, the extruded outer coating of heater wire is plasticized with pentaerythritol esters and dipentaerythritol esters preferably to the extent of 25% to 35% by weight of ester. These esters, which are characterized by a very low vapor pressure, are viscous liquids which undergo a relatively small change in viscosity with change in temperature. Preferably, the acid portion of the ester is derived from aliphatic acids containing from six to ten carbon atoms, inclusive. The esters are available on the open market and are sold under various trade names such as Monoplex S-90 of the Rohm & Haas Company and Hercoflex-707 of the Hercules Powder Company.

The esters are particularly advantageous as plasticizers in conjunction with 45% to 70% by weight of polyvinyl chloride, the balance being stabilizers and fillers. Blending may be performed in the conventional manner as by intimate mill mixing at about 320° F. or mixing in a Banbury followed by milling and dicing. The mixture is then ready for introduction to the extruder.

Figs. 1–3 show typical constructions of heater wires used in blankets having overheat control circuits similar to that disclosed in Spooner and Greenhalgh Patent No. 2,581,212, which is assigned to the same assignee as the present invention. In Fig. 1, the structure 10 includes a ribbon-like bare conductor 11 wound upon a flexible strand 12 of Fiberglas, stranded cellulose acetate, or other suitable flexible insulation. Over the conductor and in intimate contact therewith, there is provided, as by extrusion, a layer or film 13 of insulating composition, such as polyvinyl chloride, which may contain a small portion of a surface active agent as disclosed and claimed in Jacoby et al. Patent No. 2,846,560, which is assigned to the same assignee as is the present application. Wound tightly on the layer 13 is a second ribbon conductor 14, and then an extruded outer insulation layer 15 of polyvinyl chloride or other material plasticized with pentaerythritol esters and dipentaerythritol esters, including mixtures thereof.

In Fig. 2, the heater wire 10a has bare wires 16, 17, corresponding in function to the ribbon-like conductors 11 and 14 of Fig. 1, and tightly wound in parallel spaced relationship on a flexible insulating strand 18. The extruded outer insulating layer 19 contains the pentaerythritol ester and dipentaerythritol ester in accordance with this invention and may also contain a small quantity of surface active material.

In Fig. 3, the heater wire 10b differs from the wire of Figs. 1 and 2 in that both the heater conductor 21 and control conductor 22 are embedded in a thermosensitive composition 23, as by extrusion, and then are spirally wrapped around a messenger strand 24. The outer protective coating 25, consisting of polyvinyl chloride plasticized with a mixture of pentaerythritol esters and dipentaerythritol esters is then extruded over the insulated conductors 21 and 22.

Heater wire with the ester-plasticized extruded outer coating of this invention has withstood long immersion in all of the commercially used dry-cleaning solvents. Accordingly, this invention provides electric blankets which can be subjected to dry cleaning—a process preferred by many users to laundering.

While this invention has been described with reference to only three embodiments, it is understood that the invention can assume other embodiments which come within the true spirit thereof. Accordingly, it is intended that the invention shall be limited in scope only as may be necessitated by the scope of the appended claims.

What I claim as new and desire to secure by Letters Patent of the United States is:

1. A solvent-resistant wire comprising a conductor having an outer protective layer of extruded polyvinyl chloride, said composition containing from 20% to 40% by weight of a plasticizer selected from the group consisting of pentaerythritol esters and dipentaerythritol esters, and mixtures thereof.

2. A solvent-resistant wire as claimed in claim 1 wherein the acid portion of the esters is derived from aliphatic acids containing from six to ten carbon atoms, inclusive.

3. An electric heater wire comprising a non-conducting messenger strand, a pair of conductors spirally wrapped around said messenger strand, and an outer protective layer of extruded polyvinyl chloride, said composition containing from 20% to 40% by weight of a plasticizer selected from the group consisting of pentaerythritol esters and dipentaerythritol esters, and mixtures thereof.

4. Heater wire as claimed in claim 3 wherein the conductors are in the form of ribbons.

5. Heater wire as claimed in claim 3 wherein the acid portion of the esters is derived from aliphatic acids containing from six to ten carbon atoms, inclusive.

6. An electric heater wire comprising a non-conducting center messenger strand, a first conductor spirally wrapped on said messenger strand, a layer of insulating composition overlying said first conductor, a second conductor spirally wrapped around said layer of insulating composition, and an outer protective sheath of extruded polyvinyl chloride, said extruded polyvinyl chloride containing from 20% to 40% by weight of a plasticizer selected from the group consisting of pentaerythritol esters and dipentaerythritol esters, and mixtures thereof.

7. Heater wire as claimed in claim 6 wherein the conductors are in the form of ribbons.

8. Heater wire as claimed in claim 6 wherein the acid portion of the esters is derived from aliphatic acids containing from six to ten carbon atoms, inclusive.

9. An electric heater wire comprising a non-conducting center messenger strand, a pair of conductors spirally co-wrapped in spaced relation around said messenger strand, and an outer coating of extruded polyvinyl chloride, said extruded polyvinyl chloride containing from 20% to 40% by weight of a plasticizer selected from the group consisting of pentaerythritol esters and dipentaerythritol esters, and mixtures thereof.

10. Heater wire as claimed in claim 9 wherein the acid portion of the esters is derived from aliphatic acids containing from six to ten carbon atoms, inclusive.

References Cited in the file of this patent
UNITED STATES PATENTS 2,581,212    Spooner et al.  ----------- Jan. 1, 1952

OTHER REFERENCES

Hercules: Synthetic Resins (catalog copyrighted 1949), Hercules Powder Co.